Jan. 20, 1970   F. J. DEBBRECHT   3,491,369
AUTOMATIC DISPENSING SYSTEM WITH FLUID PURGING MEANS
Filed May 10, 1968   3 Sheets-Sheet 1

INVENTOR
Frederick J. Debbrecht
BY
Mortenson and Weigel
ATTORNEYS

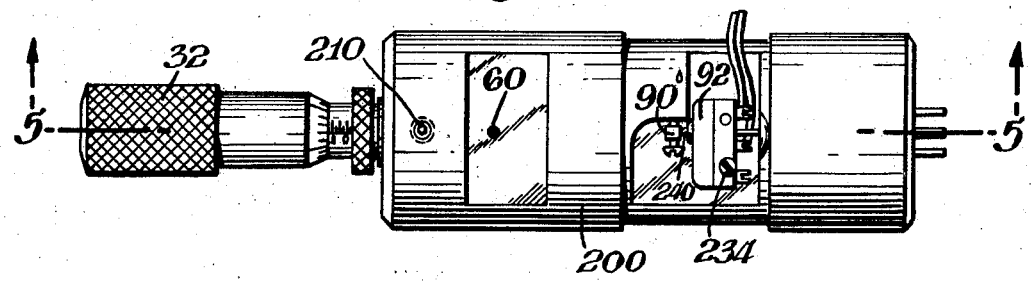
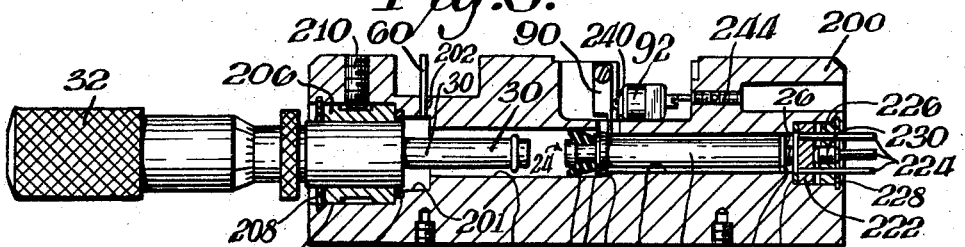
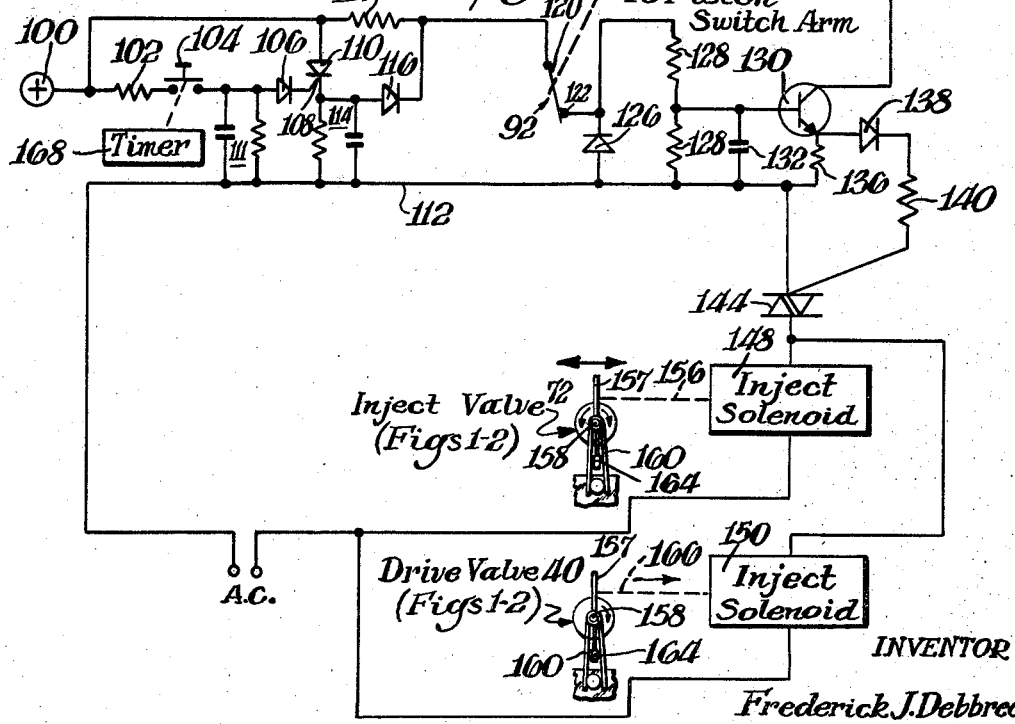

Jan. 20, 1970  F. J. DEBBRECHT  3,491,369
AUTOMATIC DISPENSING SYSTEM WITH FLUID PURGING MEANS
Filed May 10, 1968  3 Sheets-Sheet 3

INVENTOR
Frederick J. Debbrecht
BY
Mortenson and Weigel
ATTORNEYS

United States Patent Office 3,491,369
Patented Jan. 20, 1970

3,491,369
AUTOMATIC DISPENSING SYSTEM WITH FLUID PURGING MEANS
Frederick J. Debbrecht, Wilmington, Del., assignor to Hewlett-Packard Company, Palo Alto, Calif., a corporation of California
Filed May 10, 1968, Ser. No. 728,257
Int. Cl. G01f 11/06
U.S. Cl. 222—309                                    12 Claims

ABSTRACT OF THE DISCLOSURE

A metering pump dispenses adjustable volume samples of fluid through a discharge orifice. The line between the metering pump and discharge orifice is broken by a two-way valve which in one position permits fluid flow from the metering pump to the discharge orifice and in another position permits the flow of a purge gas through the discharge orifice to purge the orifice of the fluid. A sensing mechanism in the metering pump determines when the sample has been dispensed and immediately thereafter switches the valve to initiate the flow of purge gas through the discharge orifice. This prevents the sample leaking from the discharge orifice after the sample has been dispensed and thereby improves the volumetric accuracy of the sample dispensed.

---

This invention relates to a system for accurately dispensing fluid samples and, more particularly, to a system for rapidly dispensing accurately measured samples.

BACKGROUND OF THE INVENTION

In analytical laboratories, whether related to the medical, biochemical, chemical or physiological sciences, it is frequently desirable to dispense fluid samples in a precisely accurate and repeatable manner. Often in the past, samples have been dispensed utilizing tedious manual techniques which are not only time consuming but somewhat inaccurate and difficult to obtain a high degree of repeatability. Good volumetric accuracy is particularly necessary for dose preparation in the medical field and sample injection in the gas chromatography field.

In gas chromatography, a sample of a fluid or specimen to be analyzed is introduced into an injection port where it is vaporized if necessary and entrained by a moving stream of carrier gas which passes the sample through a separating column. The column selectively retards different components of the sample under analysis. Because of the selective component retardation, the sample emerges from the column with its components separated in time. If these separated components are detected and/or trapped, the individual factions or components of the sample can be obtained in a highly purified state. Unfortunately, this gas chromatography technique is a batched type operation, hence, successive samples must be injected into the gas chromatograph and the separated fractions or components collected at the outlet each run.

Many devices have been built for introducing samples into a large or preparative scale chromatograph. To maintain the high degree of purity of the separated components, highly accurate and substantially identical sample quantities must be introduced each run. These consecutive samples should be as nearly identical in size, volume, or weight as possible so that the characteristics of the eluted components, i.e., the widths and heights of the eluted chromatograph peaks, will be substantially the same. It is from these elution peaks that the several fractions are collected by fractionating the successive samples and collecting a component quantity related to a predetermined peak area of the similar components in each run. If identical samples are not injected into the chromatograph, the different elution peaks have different heights and widths and the degree of purity is degraded. These problems of repeatable accuracy in injecting the samples is of particular difficulty when using the smaller scale analytical equipment. Here samples are injected having volumes of fractions of a microliter.

Various systems have been devised in the past for the purpose of handling automatic injections. One such system is disclosed in U.S. Patent No. 3,155,289 issued Nov. 3, 1964, to James M. Kauss. While capable of metering accurate sample quantities, a problem arises using the Kauss apparatus in that after the metering pump has injected the sample through an injection port or needle, the sample remaining in the needle or line leading to the injection port tends to ooze or dribble into the flow stream of the carrier gas. This creates additional problems. The sample is not only less accurate and repeatable since the dribble is uncontrollable, but also the injection occurs over a period of time rather than as a discreet slug over a short period of time as is desirable for optimum separation. Since this dribble is not controllable it causes diverse, unpredictable separations. Tailing of the peaks occurs, resulting in cross-contamination of the sample components. Purity is degraded. It is highly desirable that a sharp, discrete slug sample injection be made in as short a time period as possible so as to not unduly disturb the gas flow stream.

Accordingly, an object of this invention is to obviate many of the disadvantages of the prior art sample dispensing systems.

Another object of this invention is to dispense accurately measured samples in relatively short periods of time.

BRIEF DESCRIPTION OF THE INVENTION

In accordance with a preferred embodiment of this invention, a sample dispensing system includes a metering pump for discharging an adjustable volume of a fluid. A discharge line connected to the metering pump passes the metered fluid from the pump to a discharge line or orifice. A flow control means or valve is interposed in the discharge line and functions to first permit the passage of the sample to the discharge orifice and immediately thereafter permits the passage of a purge fluid from a purge line through the discharge orifice. Thus a sample may be dispensed with a higher degree of repeatable accuracy and in a shorter period of time than has heretofore been possible. This enhances the ability of a gas chromatograph, for example, to separate the fluid sample into its components.

BRIEF DESCRIPTION OF THE DRAWINGS

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

FIGURE 4 is a pictorial view of the metering pump including a sensing device which senses the position of the dispensing piston;

FIGURE 5 is a cross-sectional view of the metering pump of FIG. 4 taken along the section lines 5–5 of FIG. 4;

FIGURE 6 is a partial circuit schematic and partial block diagram of the electronic control circuit which controls the operation of the solenoid operated valves illustrated in FIG. 1.

DESCRIPTION OF THE PREFERRED EMBODIMENT

Figure 1:
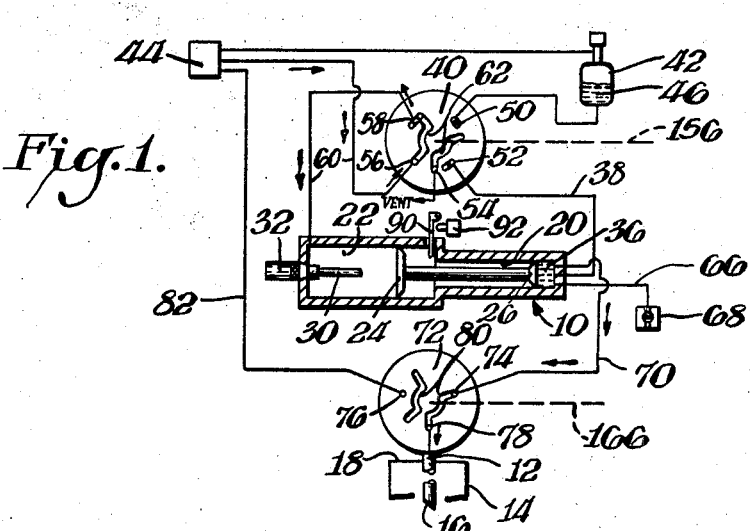
FIGURES 1 and 2 are schematic flow diagrams of the automatic sample dispensing system of this invention shown in each of its two different operating conditions: inject and purge-refill, respectively.

The system of this invention may be most easily understood by reference to the schematic flow diagram of FIG. 1. This flow diagram shows the various flow control means positioned to dispense a sample from a metering pump 10 through a feed line 12 into a container represented by the partial block 14. In this instance, the container may be a vial, bottle, or the input of various analytical systems such as the injection block of a gas chromatograph. In the case where the container 14 symbolizes the injection block of a gas chromatograph, carrier gas flows into the injection block to sweep any sample which is injected through the line 12 and vaporized through a separating column (not shown). The feed line 12 has an orifice 16, which, when utilized with a gas chromatograph, may be the sharpened end of a hollow needle. The end of the feed line 12 is sharpened to facilitate the penetration of the elastomeric septum material which seals the flow system of a gas chromatograph from the surrounding atmosphere. The septum itself is not illustrated but may be symbolized by the top line 18 of the box 14.

The metering pump 10 includes a metering cylinder 20, a drive cylinder 22, a drive piston 24 and a metering piston 26. The drive cylinder 22 is formed to be of greater diameter than the metering cylinder 20 for reasons that will be understood from the following description. Furthermore, the two pistons 24 and 26 are operatively connected together such that they move in a reciprocal manner in unison within their respective drive and metering cylinders 22 and 20.

The outside end of the drive cylinder 22 (the lefthand end in the drawing) has included therein an adjustable rod 30 to regulate the back stroke of the drive piston 24. The rod 30 which is adjustable along the axis of the drive cylinder 22 may be the end of a micrometer 32. Any other suitable screw type device may be used as well but a micrometer is preferred because of its precision of adjustment. The chamber 36 formed by the metering cylinder 20 and the metering piston 26 is termed the metering chamber 36. By adjusting or limiting the back stroke of the drive piston 24, and hence the length of the forward stroke of the metering piston 26, the amount of fluid that may be contained within the metering chamber 36 is determined.

The metering chamber 36 is filled through an orifice in the end face of the metering cylinder 20 through a fluid feed line 38. The fluid feed line 38 couples a pressurized sample reservoir 42, which receives its gas pressure from a source of carrier gas 44, through a two-position, five-port solenoid actuated valve 40 to the metering chamber 36. The carrier gas may be any suitable pressurized gas which will not contaminate the sample or, in the case of chromatography, which will not react with the sample or separating column. In gas chromatography typical gases are nitrogen, helium, or hydrogen. The pressurized sample reservoir 42, although illustrated as being pressurized by the source of carrier gas 44, may be a self-contained pressurized sample bomb in which the sample fluid 46 is stored under pressure.

The fluid feed line 38 is connected between the first port 50 of the valve 40 and the sample reservoir 42 and again between the second valve port 52 and the metering chamber 36 to complete the fluid feed from the sample reservoir 42 to the metering chamber 36. The third port, in a clockwise sense about the valve 40, is designated 54 and is connected to atmosphere or vent as denoted by the arrow. The last two ports of the valve 40 are designated 56 and 58, respectively, and with the valve 40 in the position shown in FIG. 1, interconnect carrier gas from the source 44 to the drive cylinder 22 through a drive gas line 60. The drive gas and feed lines may be any suitable tubing capable of withstanding the fluid pressures involved. Stainless steel tubing is preferred although an inert plastic tubing may be used.

The valve 40 may be any suitable two-position or other solenoid actuated valve capable of interconnecting pairs of lines together and may be similar in construction to that described, for example, in the Watson et al. Patent 2,757,541 issued Aug. 7, 1956. Valves of this type are available commercially, for example, from Hewlett-Packard Company, Avondale, Pa.

As is typical, the valve 40 includes a body or stator portion in which the ports 50, 52, 54, 56 and 58 are formed in one face. A grooved disc or rotor, denoted schematically by the grooves 62, made of an inert self-lubricating plastic such as polytetrafluoroethylene, sold under the trademark "Teflon," effects the switching action to disconnect or interconnect various pairs of the ports 50, 52, 54, 56 and 58 in the valve body. The grooved rotor 62 is rotated to perform this selective interconnection. The rotor 62 in the rotary position of FIG. 1 interconnects the ports 56 and 58 which are in the drive gas line 60. Rotation of the rotor 62 from its extreme clockwise rotational position illustrated in FIG. 1 to its extreme counterclockwise rotational position illustrated in FIG. 2 changes the interconnection. Thus in FIG. 2 the rotor 62 interconnects the fluid feed lines 38 to permit flow from the sample reservoir 42 to the metering chamber 36 and simultaneously permits gas from the drive cylinder 22 to escape through the drive gas line 60, port 58 and the vent port 54 to atmosphere.

The metering chamber 36 also is connected through a drain line 66 and a drain cock 68 to waste receptacles. It may be used for purposes of cleaning the metering chamber. In like manner a discharge line 70 is connected from the metering chamber 36 through a second flow control valve, designated as injection valve 72, to the dispensing tube 12 and exhaust or dispensing orifice 16. The inject valve 72 is similar in construction to the valve 40 but in this case is a two position, three-port valve in which the grooved rotor 80 functions to interconnect either of the first two ports 74 and 76, respectively, to the third outlet port 78 of the valve stator. The third port 78 is connected to the dispensing tube 12. The grooved rotor 80 in its extreme clockwise rotational position illustrated in FIG. 1, connects the discharge line 70 via port 74 to the dispensing tube 12 and discharge orifice 16 via port 78. A purge gas line 82 is connected between the carrier gas source 44 and the second port 76. Flow through this line is blocked. This position of the injection valve 72 is designated the inject position.

Figure 2:
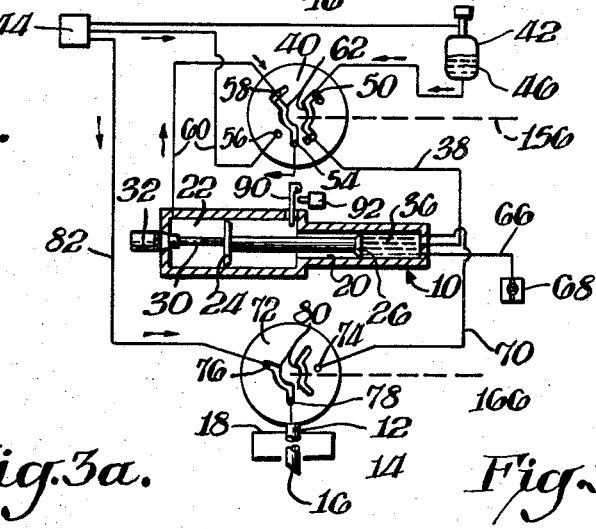

In FIG. 2 the valves 40 and 72 are shown in their counterclockwise rotational position. In this position, the metering chamber is refilled and the dispensing tube 12 purged. With the rotor 80 of the injection valve 72 in its extreme counterclockwise rotational position, gas flow through the discharge line 70 is blocked, but flow through the purge gas line 82, and the tube 12 to the dispensing orifice 16 is permitted.

In accordance with this invention the purge is initiated substantially immediately after injection is complete. To sense completion of the injection or dispensation of the sample, an actuating arm 90 functions to open and close a microswitch 92. The actuating arm is positioned within the drive cylinder 22 of the metering pump to sense when the drive piston 24, and hence the metering piston 26, reach the end of their stroke, i.e., when all of the fluid in the metering chamber 36 is expelled. The movement of the switch arm 90 and microswitch 92 causes a controller circuit, illustrated in more detail in FIG. 6, to switch both the drive valve 40 and the injection valve 72 to their neutral or unactuated positions. In the neutral position, purge gas flows through the dispensing tube 12 and discharge orifice 16.

The circuit used to perform this control function and to actuate or drive the grooved sliders 80 and 62 of the respective drive valve 40 and injection valve 72 is illustrated in FIG. 6. The control circuit includes a source of direct current supply voltage 100 which is coupled through a series connected resistor 102, a pushbutton switch 104, and the forward conducting direction of a silicon diode 106 for isolation purposes to the control electrode 108 of a silicon controlled rectifier 110. The anode of the rectifier 110 is connected to the direct current supply source 100. An R-C filter network is connected between the switch 104 and diode 106 to a common line 112. The cathode of the silicon controlled rectifier 110 is connected through an R-C filter circuit 114 to the common line 112 and through the forward conducting direction of a second diode 116 to the common terminal of the microswitch 92. A resistor 117 which forms part of a voltage dividing network including two serially connected resistors 128 and the armature 120 of the microswitch 92, is connected from the anode of the silicon controlled rectifier 110 to the common terminal of the microswitch 92. The armature 120 of the microswitch is shown in its normally closed position, that is, when the switch arm 90 is released by the back or refill stroke of the drive piston 24 (FIG. 1) such that it is in electrical contact with the normally closed switch contact 122. When the drive piston 24 moves to the right in the drawing, it opens the microswitch, i.e., moves the switch armature 120 away from the switch contact 122.

The normally closed terminal or contact 122 of the microswitch 92 is connected through the cathode electrode of a third diode 126 to the common line 112 and through the pair of series connected voltage dividing resistors 128 to the same common line 112. The junction point between the series connected voltage dividing resistors 128 is connected to the base electrode of an NPN transistor 130 and through a capacitor 132 to the common line 112. The voltage dividing resistors 128 each have a value approximately one-fifth of the value of the resistor 117. In one circuit constructed and operated successfully, the resistor 117 was 10,000 ohms and each of the resistors 128 were 2,200 ohms. This network supplies a biasing voltage which is insufficient to cause conduction of the transistor 130. The transistor 130 has a collector electrode which is connected to a source of potential designated 101. The emitter electrode of the transistor 130 is connected through an emitter resistor 136 to the common line 112 and through a diode 138 positioned in the forward conducting direction and a serially connected resistor 140 to the control electrode of a triac 144 or other similar current control device. Back-to-back connected silicon controlled rectifiers, for example, could be substituted for the triacs. The triac 144 is connected between the common line 112 and the power input terminals of the first and second injection solenoids 148 and 150, respectively. The first and second solenoids 148 and 150, respectively, are conventional and in the presence of a power signal, such as an alternating current signal derived from the triac 144, tend to move their respective actuating arms in one direction or another. The actuating arms of the respective injection solenoids 148 and 150 are illustrated by the dashed lines 156 and 166, respectively.

Thus upon energization, the respective injection solenoids 148 and 150 move the actuating arms 156 and 166 to the right in the drawing and conversely, if de-energized, permit the actuating arms 156 and 166 to move to the left in the drawing. The leftward movement is created by the action of tension springs 160. The actuating arms 156 and 166 are each mechanically coupled, as by pins inserted in the linkage, to respective crank arms 157. The crank arms 157 are keyed to rotate the respective drive shafts 158. The drive shafts 158 rotate the grooved slider 80 of the injection valve 72 and the grooved slider 62 of the drive valve 40 (FIG. 1), respectively. The lower portion (in the drawing) of the crank arms 157 are bent as at 164 to extend outwardly (from the plane of the drawing) to engage the respective ends of tension springs 160.

To rotate the needle valve 72 to the extreme clockwise position illustrated in FIG. 1, the first injection solenoid 148 is energized. Conversely, to rotate this same needle valve to its extreme counterclockwise position illustrated in FIG. 2, the first injection solenoid 148 is simply de-energized and the tension spring 160 acts on the bent portion 164 of the crank arm 157 to rotate the drive shaft 158. The drive valve 40 operates in a similar manner and is driven by the injection solenoid 150 to its extreme clockwise position when the solenoid is energized and when the solenoid is de-energized the action of tension spring 160 on the crank arm 157 drives the drive shaft 158 to its extreme clockwise position as ilustrated in FIG. 2. The tension springs 160 need not be used since most solenoids have their own spring return which often is adequate. The tension spring return is preferred because of its rotational accuracy.

DESCRIPTION OF THE SYSTEM OPERATION

Initially the transistor 130 is non-conducting being biased off by the network including resistors 117 and 128. The valves 40 and 72 remain in their neutral position illustrated in FIG. 2 with purge gas flowing through the dispensing tube 12 and fluid 46 in the sample reservoir 42 under pressure from the carrier gas 44 flowing through the first and second ports 50 and 52 of the drive valve 40 to fill the metering chamber 36 of the metering pump 10. During this filling cycle, the backside of the drive cylinder 32 is opened through the drive gas line 60 and the third and fifth ports 54 and 58 of the drive valve 40 to atmosphere or vent. Hence, with the increased fluid pressure of the fluid 46 acting on the area of the metering piston face 26, the double piston assembly 24–26 moves to the left in the drawing and fills the metering chamber to the extent permitted by the adjustment of the adjusting screw or micrometer 32.

To initiate a dispensing cycle the voltage from source 100 is applied to the control electrode of the controlled rectifier 110 either by depressing the pushbutton switch 104 (FIG. 6) or, for example, by using a timer 168 to close the switch contacts at selective time intervals to initiate successive sample injections. In lieu of the timer 168, the pushbutton switch 104 or the switch 104 terminals may be closed a predetermined time after the return of the armature 120 of the microswitch to its normally closed contact 122 signifying a substantial completion of an injection. Many suitable circuits are available for this purpose.

In any event, once the pushbutton switch is closed, the first controlled rectifier 110 is triggered. Current flows from the positive supply 100 through the resistor 114 to the common line 112 and through the isolating diode 116, the microswitch 92, normally closed contact 122, and the voltage dividing resistors 128 to the common line 112. The conduction of the diode 116 effectively by-passes the biasing resistor 117. This removes 10,000 ohms from the total 14,000 ohm voltage divider network which maintains the transistor 130 in a normally non-conducting state. The full supply voltage now is applied across only the voltage divider 128 and transistor 130 is biased to conduct, thereby triggering the second triac 144 for the injection solenoids 148 and 150 through the diode 138. Thus eneregized, each of the injection solenoids 148 and 150, respectively, rotate the grooved sliders 80 and 62 of the injection valve 72 and drive valve 40, respectively, to their extreme clockwise positions illustrated in FIG. 1.

The injection phase is initiated. When the inject solenoids 148 and 150 rotate the respective valves 72 and 40 to their extreme clockwise position illustrated in FIG. 1, several events take place. Firstly, the sample reservoir 42 is disconnected from the system by the rotation of the grooved slider 80. Simultaneously therewith the carrier gas source 44 is connected through the drive gas line 60 and the fourth and fifth ports 56 and 58 of the drive valve 40 to the drive cylinder 22. The drive piston 24 drives the fluid from the metering chamber through the discharge line 70. The fluid flow passes through the input port 74 of the injection valve 72 and out the port 78 thence through the dispensing tube 12 and dispensing orifice 16 into the chromatograph system or other container denoted by the block 14.

As the drive piston 24 reaches the end of its travel to the right in the drawing (FIG. 1) such that the discharge of the sample from the metering chamber 36 is virtually complete, the arm 90 is moved causing the armature of the microswitch 92 to move away from the normally closed contact 122. This movement of the armature 120 breaks the circuit of the controlled rectifier 110 and it ceases conduction. Current flowing through the R-C filter network 114 is insufficient to sustain conduction. The resistor 117 is no longer by-passed and the first transistor 130 ceases conduction as does the triac 144. The inject solenoids 148 and 150 are de-energized permitting respective injection and drive valves 72 and 40, respectively, to return under the action of the returning springs 160 to their neutral position as illustrated in FIG. 2. Conditions again now exist in which the metering chamber 36 refills through the feed line 38 as previously described.

Simultaneously therewith, i.e., immediately after the sample is dispensed from the metering chamber, purge gas flows through the purge gas line 82 and the drive valve 40, and dispensing tube 12 to the discharge orifice 16. Hence, carrier gas flushes out or purges the dispensing tube 12 and its dispensing orifice 16 of any remanant fluid which was left therein. This purging occurs substantially immediately after the injection cycle such that the entire volume of sample expelled from the dispensing orifice 16 into the container or gas chromatographic system 14 is dispensed accurately and precisely in a very short period of time. This rapid dispensing of the sample often is referred to as "slug" injection. The advantages of immediately purging the dispensing tube 12 and discharge orifice 16 are manifold. First of all in the gas chromatography application if there were no purging of the dispensing tube, the fluid remaining therein after the closure of the discharge line 70 by the injection valve 72 would be permitted to dribble out and become entrained in the carrier gas flow. Since the injection port of the gas chromatograph is heated, the sample in the dispensing tube or needle tends to vaporize slowly over a finite period of time as the needle heats. This slow vaporization is the equivalent of introducing a small amount of the sample well after the main portion has been injected and entrained in the carrier gas flow. This small remaining or tail portion of the sample injection tends to contaminate and prevent the pure separation of the sample into its component parts. Unfortunately, the smaller the sample size, the greater the percentage of contamination caused by this tailing. The volume of fluid left in the needle assumes a larger and larger proportion of the injected sample as the sample size decreases.

Figure 7:
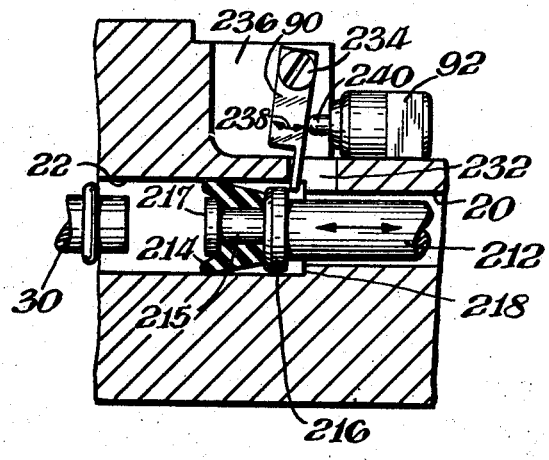
FIGURE 7 is an enlarged view of a portion of the cross-sectional view of FIG. 5 showing the particular relationship between the actuating arm of the microswitch and the pistons of the metering pump.

A preferred construction of the metering pump 10 is illustrated in FIGS. 4, 5, and 7 although it is to be understood that any metering pump with any sensing means for ascertaining the position of the pistons may be employed. In FIGS. 4 and 5 there is seen the micrometer 32 which is introduced into one end of a hollow cylindrical housing 200. The cylindrical housing 200 may be formed of any suitable material such as stainless steel and is bored to form the metering cylinder 20 and counterbored to form the drive cylinder 22. In turn, the outside end of the drive cylinder 22 is again counterbored as at 201 to accommodate the introduction through a radial bore 202 of gas from the drive gas line 60. The drive gas line may be any suitable stainless steel tubing and may be soldered or coupled by a conventional tubing connector into the counterbore 201. The counterbore 201 is again counterbored as at 204 to accommodate a sleeve clamp 206 which engages the periphery of the micrometer 32. The sleeve clamp 206 has an O-ring seal 207 at the inner end to seal the drive cylinder 22 and a retaining ring 208 at the other end inserted into an internal annular groove within the counterbore 204. The retaining ring retains the sleeve clamp which holds the micrometer 32 by a friction fit. A set screw 210 aids in positioning and securing the sleeve clamp 206 within the outer bore 204.

The metering piston 26 may be nothing more than an elastomeric sealing washer 209 or suitable sealing O-ring engaged to the end face of a connecting rod 212 which connects the metering piston 26 with the drive piston 24. The sealing washer 209 has a slightly larger diameter than the connecting rod 212. The drive piston 24 may comprise another elastomeric sealing washer or ring (FIG. 7) mounted on a screw head 215 tapped into the end face of the connecting rod 212. A rigid flange 216 forms part of the screw head and provides a solid member to abut against the step 218 formed by the point of meeting between the metering cylinder 20 and the drive cylinder 22. The abutting step 218 and flange 216 determine the end of the piston discharge stroke. The screw head 215 also has an end flange 217 for retaining the drive cylinder washer 214. Other known seals for the pistons may be employed as desired.

The open end of the metering cylinder 20 is closed off by a flat elastomeric sealing washer 220 which is retained in place by an end disc or piece 222 in which are secured three tubes 224 connected respectively to the drain line 66, the discharge line 70 (FIG. 1), and the feed line 38 (FIG. 1). The flat washer 220 may be non-metallic whereas the end piece 222 preferably is of stainless steel or other rigid material. The end piece 222 is retained in position by a locking plate 226 held by an internal retaining ring 228 with a set screw 230 passing through the locking plate 226 to engage the end piece 222.

To accommodate the switch arm 90 of the microswitch 92, a radial bore 232 (FIG. 7) is formed at the junction or step 218 between the drive and metering cylinders 20 and 22, respectively. At this point a peripheral portion of the cylindrical member 200 is cutaway to provide a planar portion 236 lying in a plane substantially intersecting the axis of the bores in the cylinder 200. The switch arm 90 is pivoted as by a screw 234 attached to the planar portion 236 to permit a pendulum motion of the arm 90 as denoted by the arrow 238. When the drive piston 24 during its power stroke reaches the point illustrated in FIG. 7, its flange 216 engages the arm 90 and moves it against the pin 240 of the microswitch 92. The microswitch itself is pivotably mounted at one edge by a screw 233 (FIG. 4) tapped into the cylinder 200. The inward movement of the pin 240 moves the contact arm 120 (FIG. 6) of the microswitch from normally closed contact 122 to its normally open contact 120 (FIG. 6). The purge and refill cycle is now begun. Inertia of the pistons and system inertia permit the flange 214 to continue its movement until positively stopped by the step 218.

Figure 3A:
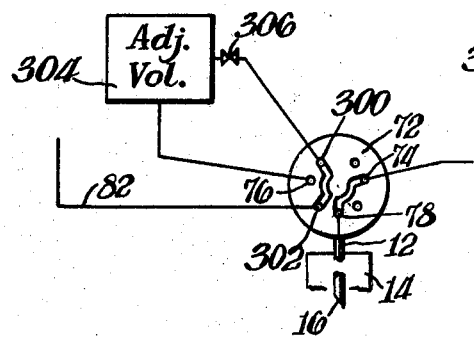
FIGURES 3a and 3b are partial schematic diagrams of an alternative embodiment of this invention in which purging of the discharge orifice is accomplished using a fixed volume of purge gas.
Figure 3B:
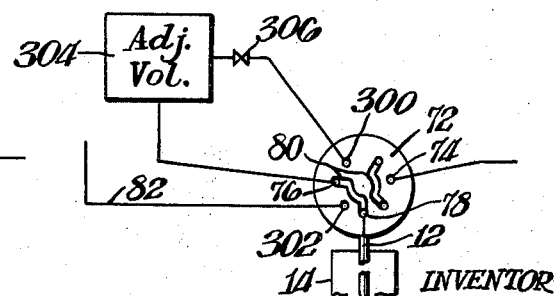

In the case of gas chromatography it is not always desirable to permit the purge gas to flow through the dispensing tube or needle 12 continuously. In accordance with one embodiment of this invention, provision is made so that a fixed volume of purge gas passes through the dispensing tube 12 immediately after the injection phase has ceased. This embodiment is illustrated in FIGS. 3a and 3b. In FIGS. 3a and 3b only the injection valve 72 of FIGS. 1 and 2 is illustrated. In this instance, however, the stator of the injection valve 72 is provided with an additional two conduits or ports 300 and 302, respectively. These ports are positioned equidistantly on either side of the existing port 76 illustrated in FIG. 1, for example. In accordance with this alternative embodiment, the purge gas line 82 is connected to the new port 302 and the existing port 76, instead of being connected to the purge gas line 82, is now connected to the output line of an adjustable volume pressurized container 304 of any suitable design. The remaining port 300 is connected through a flow restrictor 306 to the input of the adjustable volume container 304. The remainder of the injection valve 72 is the same as previously described including the grooved slider 80 which is rotated in order to interconnect different ones of the ports.

In its operation during the injection phase shown in FIG. 3a, the purge gas line is connected through the ports 300 and 302 and the restrictor 306 to the adjustable volume chamber 304. In this manner, during the injection phase, the container 304 is permitted to fill. Now when the injection valve 72 is switched to the purge and refill position shown in FIG. 3b the stored known volume of purge gas in the container 304 is permitted to flow through the ports 76 and 78 of the metering valve 72 and thence through the dispensing tube 12 and discharge orifice 16. The purge continues until the volume of gas is exhausted. This is a finite determinable time and can be accurately used to control the amount or time of purge. The quantity of purge gas stored is a function of the particular sample to be injected. If larger samples are being injected, a larger volume of purge gas will be used. The reverse is also true. The larger quantities of purge gas could be used in the case where viscous samples were required.

In still another embodiment, the injection valve of FIG. 1 could be continuously supplied with a pressurized sample supply and opened for varying periods of time to dispense different sample volumes. The immediate purge of this invention is useful in these applications as well.

There has thus been described a unique system of automatically injecting discrete samples of a fluid into a container. The container may be an analytical system or any container to be filled automatically. Immediately upon the completion of each injection cycle a purge gas is flowed through the dispensing tube and orifice such that any residual fluid is immediately flushed out so that the entire sample reaches the container in a finite, short period of time. This has particular advantages in analytical systems such as gas chromatography.

While the invention has been disclosed herein in connection with certain embodiments and certain structural details, it is clear that changes, modifications or equivalents can be used by those skilled in the art.

What is claimed is:
1. A system for dispensing a fluid from a dispensing orifice comprising, in combination:
   a feed line for supplying said fluid to said orifice,
   a purge gas line for supplying a purge gas to said orifice,
   fluid flow control means in said feed and purge gas lines operative in a first position to couple said feed line to said orifice and in a second position to couple said purge gas line to said orifice, and
   means for switching said fluid flow control means directly from said first to said second positions upon completion of the dispensation of said fluid, thereby to purge substantially immediately said orifice of any fluid.

2. A system according to claim 1 which includes gas storage means coupled to said purge gas line for supplying said purge gas,
   said gas storage means having an adjustable volume, thereby to vary the purge time of said orifice.

3. A system according to claim 1 which includes means in said feed line for determining the completion of said sample dispensation, said switching means being responsive to said determining means for switching said control means.

4. A system for accurately dispensing a fluid from a dispensing orifice in response to a start signal comprising, in combination:
   a metering pump having a metering chamber of first adjustable volume,
   a feed line for supplying said fluid to said metering chamber from a pressurized source of supply,
   a discharge line for passing said fluid from said metering chamber to said discharge orifice,
   a purge line for supplying purge gas,
   drive means for alternately discharging said fluid from said metering pump through said discharge line and dispensing orifice in response to said start signal and refilling said metering pump with said fluid from said feed line,
   sensing means associated with said metering pump for providing a first signal upon the completion of said discharge, and
   first fluid flow control means in said discharge line and connected to said purge gas line operative (a) in response to said start signal to couple said metering pump to said dispensing orifice and (b) in response to said first signal to couple said purge gas line to said dispensing orifice, thereby to purge said orifice substantially immediately upon completion of said discharge.

5. A system according to claim 4 which also includes a gas storage means connected to said flow control means, said flow control means being operative in response to said start signal to couple said storage means to said purge gas line and in response to said first signal to couple said storage means to said discharge orifice.

6. A system according to claim 5 wherein said gas storage means is of adjustable volume, thereby to vary the purge time of said orifice.

7. A system for accurately dispensing a fluid from a dispensing orifice in response to a start signal comprising, in combination:
   a metering pump for discharging a predetermined volume of said fluid in response to said start signal,
   a feed line for supplying said fluid to said metering pump,
   a discharge line for passing said fluid from said metering pump to said discharge orifice,
   a purge gas line for supplying a purge gas,
   fluid flow control means in said discharge line and connected to said purge gas line for passing said volume of fluid through said orifice and substantially immediately thereafter purging said orifice and that portion of said discharge line betwen said orifice and said flow control means with said purge gas, thereby to improve the volumetric accuracy of dispensed fluid and decrease the dispensing time.

8. A system according to claim 7 which also includes sensing means associated with said metering pump for determining the completion of fluid discharge therefrom, said flow control means being responsive to said sensing means to purge said orifice and discharge line portion.

9. A system according to claim 8 which includes a gas storage means coupled with said flow control means for storing said purge gas during said fluid discharge and thereafter passing said stored purge gas through said orifice and discharge line portion.

10. A system according to claim 7 which also includes a gas storage means coupled with said flow control means for storing said purge gas during said fluid discharge and thereafter passing said stored purge gas through said orifice and discharge line portion.

11. A system according to claim 10 wherein said purge gas from said purge gas line is supplied under pressure to said dispensing orifice and said storage means.

12. A system according to claim 11 wherein said gas storage means is adjustable in volume, thereby to vary the purge time of said dispensing orifice and said discharge line portion.

References Cited
UNITED STATES PATENTS

| | | | |
|---|---|---|---|
| 3,199,274 | 8/1965 | Norem et al. | 55—386 |
| 3,425,807 | 2/1969 | Levy | 55—386 X |

STANLEY H. TOLLBERG, Primary Examiner

U.S. Cl. X.R.

55—386